US012662838B2

(12) United States Patent
Brott

(10) Patent No.: US 12,662,838 B2
(45) Date of Patent: Jun. 23, 2026

(54) MODULAR LATTICE TOWER

(71) Applicant: Inventus Holdings, LLC, Juno Beach, FL (US)

(72) Inventor: Aziz S. Brott, Arvada, CO (US)

(73) Assignee: Inventus Holdings, LLC, Juno Beach, FL (US)

( * ) Notice: Subject to any disclaimer, the term of this patent is extended or adjusted under 35 U.S.C. 154(b) by 178 days.

(21) Appl. No.: 18/433,876

(22) Filed: Feb. 6, 2024

(65) Prior Publication Data

US 2025/0250812 A1     Aug. 7, 2025

(51) Int. Cl.
| *E04H 12/10* | (2006.01) |
| *E04H 12/20* | (2006.01) |
| *E04H 12/22* | (2006.01) |
| *E04H 12/34* | (2006.01) |
| *H02G 7/20* | (2006.01) |

(52) U.S. Cl.
CPC ............. *E04H 12/10* (2013.01); *E04H 12/20* (2013.01); *E04H 12/2253* (2013.01); *E04H 12/34* (2013.01); *H02G 7/20* (2013.01)

(58) Field of Classification Search
CPC ..... E04H 12/10; E04H 12/20; E04H 12/2253; E04H 12/34; H02G 7/20
See application file for complete search history.

(56) References Cited

U.S. PATENT DOCUMENTS

| 948,088 | A | * | 2/1910 | Craven | .................... E04H 12/10 |
| | | | | | 52/651.04 |
| 1,010,408 | A | | 12/1911 | Bates | |
| 1,119,521 | A | | 12/1914 | Marbury | |
| 1,403,051 | A | * | 1/1922 | Moore | .................... E04H 12/10 |
| | | | | | 52/638 |

(Continued)

FOREIGN PATENT DOCUMENTS

| EP | 2759661 | 3/2016 |
| EP | 4001550 | 5/2022 |

(Continued)

OTHER PUBLICATIONS

Https://www.altron.co.uk/standard_lattice_towers.html, Accessed: Nov. 17, 2023 1:47 PM.

(Continued)

*Primary Examiner* — Jessie T Fonseca
(74) *Attorney, Agent, or Firm* — TROUTMAN PEPPER LOCKE LLP; Dustin B. Weeks

(57) ABSTRACT

A tower has an above ground portion and an embedded portion joined to the above ground portion. The above ground portion and the embedded portion have a respective plurality of modular sections where each respective modular section in each of the respective plurality of modular sections has a respective vertical height and a quadrilateral plan view cross section with equal plan view outer dimensions over the respective vertical height of the modular section. At least one lower modular section in the above ground portion (Continued)

comprises a stronger structure than a modular section that is above the at least one lower modular section. Each modular section in each of the respective plurality of modular sections has corner struts that are parallel to one another and modular sections in each of the respective plurality of modular sections are arranged in a linear sequence.

19 Claims, 12 Drawing Sheets

(56)                    References Cited

U.S. PATENT DOCUMENTS

| 1,506,984 | A | | 9/1924 | Marshall | |
|---|---|---|---|---|---|
| 1,584,691 | A | * | 5/1926 | Bowman | E04H 12/10 |
| | | | | | 52/693 |
| 1,601,059 | A | * | 9/1926 | Black | E21B 15/00 |
| | | | | | 52/651.06 |
| 1,676,538 | A | * | 7/1928 | Foster | E04H 12/10 |
| | | | | | 52/638 |
| 1,676,539 | A | * | 7/1928 | Foster | E04H 12/10 |
| | | | | | 52/638 |
| 1,793,928 | A | | 2/1931 | Hammel | |
| 1,846,682 | A | | 2/1932 | Hammel | |
| 1,936,272 | A | | 11/1933 | Schulz | |
| 2,401,229 | A | | 5/1946 | Cohen | |
| 2,828,841 | A | | 4/1958 | Weeks | |
| 3,007,232 | A | | 11/1961 | Thiry | |
| 3,112,015 | A | * | 11/1963 | Anderson | E04H 12/10 |
| | | | | | 52/651.02 |
| 3,371,458 | A | | 3/1968 | Sturgill | |
| 3,634,989 | A | | 1/1972 | Rogers | |
| 4,769,959 | A | * | 9/1988 | Lindsey | E04H 12/10 |
| | | | | | 343/875 |
| 9,371,662 | B1 | * | 6/2016 | Pereira | E04B 1/19 |
| 10,760,293 | B2 | | 9/2020 | Abreu et al. | |
| 2005/0001131 | A1 | * | 1/2005 | Stevens | E04H 12/10 |
| | | | | | 248/351 |
| 2011/0126488 | A1 | | 6/2011 | Hedinger et al. | |
| 2012/0045345 | A1 | * | 2/2012 | Horton, III | E02B 17/027 |
| | | | | | 29/889 |
| 2017/0114565 | A1 | * | 4/2017 | Lindsey | B64D 1/22 |
| 2017/0321659 | A1 | * | 11/2017 | V | E04C 3/36 |
| 2021/0108412 | A1 | * | 4/2021 | Heath | E04C 2/049 |
| 2022/0268048 | A1 | * | 8/2022 | Miller | E04H 12/08 |

FOREIGN PATENT DOCUMENTS

| WO | 2022123521 | 6/2022 |
|---|---|---|
| WO | 2023175631 | 9/2023 |

OTHER PUBLICATIONS

Https://www.altron.co.uk. "Modular Towers & Columns Foundation & Bolting Details", Nov. 17, 2023.
Https://apacinfrastructure.com.au/gt1000-galvanised-free-standing-lattice-tower Accessed Nov. 17, 2023 1:55 PM.
Https://www.simolingroup.com/wordpress/tower/lattice-tower/ Accessed Nov. 17, 2023 2:08 PM.

* cited by examiner

MODULAR LATTICE TOWER

FIELD OF THE DISCLOSURE

The present disclosure generally relates to tower structures, and more particularly to tower structures that are constructed from modular sections.

BACKGROUND

Construction of a series of support tower structures, such as tower structures that support electrical power distribution or transmission lines, presents a number of challenges. The design phase of an electrical power distribution or transmission line, or any kind of cable or other material, referred to herein generally as a "line" in the following description, often starts with a common design for the support towers that are to be used along the line. Such designs sometimes take place before the actual route of the line is finalized or all of the parameters of the land over which the line will run have been ascertained. As construction of the line progresses, the actual conditions, such as soil conditions, actual elevation, other conditions, or combinations of these, that are present at the individual locations of each support tower sometimes deviate from the conditions that were assumed during the initial design phase. Installing a support tower at a site with different conditions that contemplated during the tower's design involves alteration of the design of that support tower.

Altering the design of conventional support towers to accommodate conditions at an installation site that are different from those contemplated during that support tower's initial design can introduce challenges. Large support towers, such as those designed for use in long distance electric power transmission lines, generally have long lead times to procure, build, and deliver those support towers. Such support towers are therefore often pre-ordered before the final route of the power line is fully defined and thus the conditions at those sites may be uncertain.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
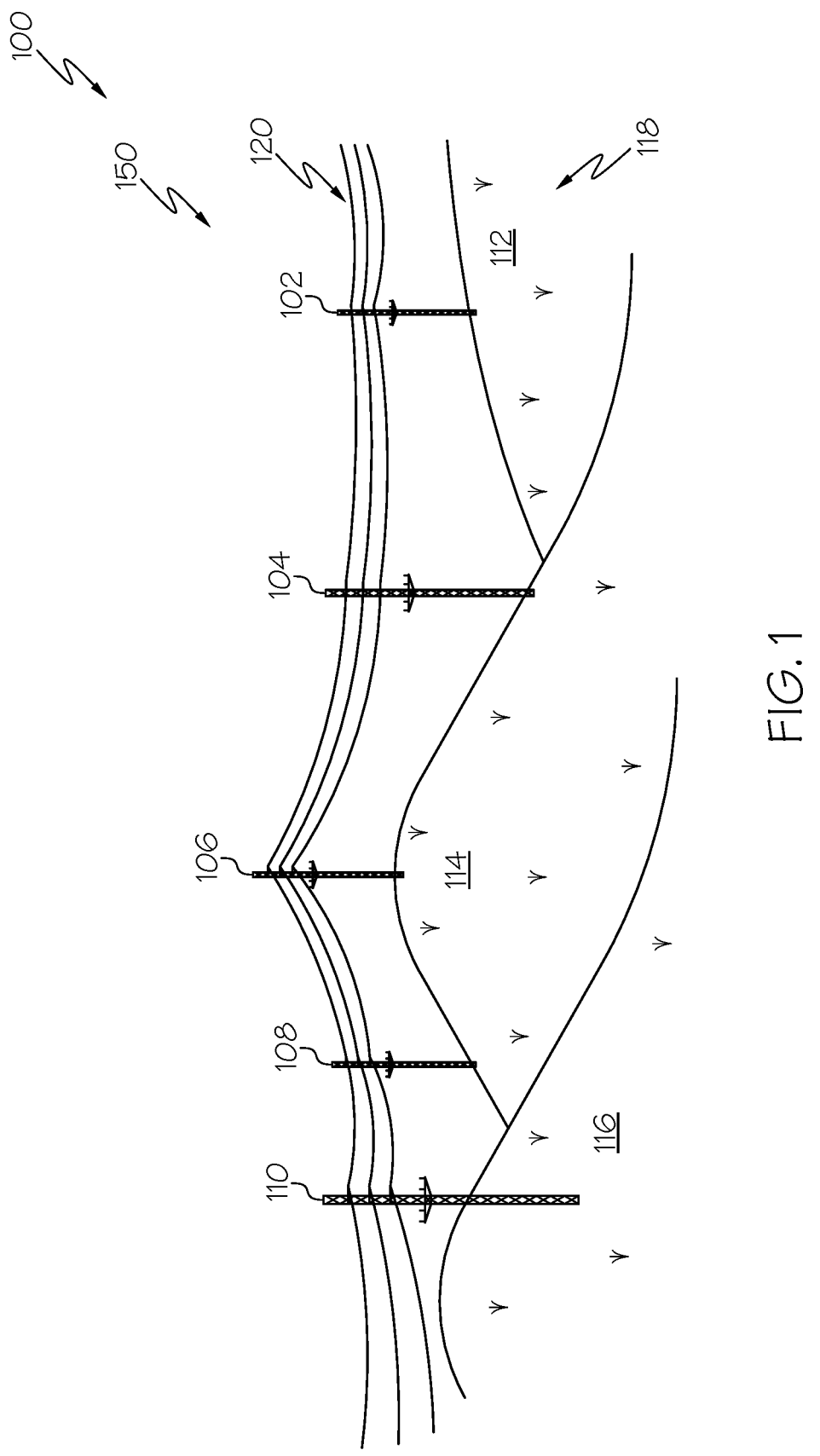
FIG. 1 illustrates an example of an installed line portion, according to an example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

Described below are modular support tower structures, which are generally referred to as towers herein, that are designed to be constructed by assembling modular sections in a flexible arrangement. These towers are assembled by connecting together modular sections in an end-to-end fashion where each modular section forms a vertical portion of that tower. These modular sections are constructed to each have a similar structure and a uniform interface at their ends to allow any two modular sections to be interchangeably connected. In an example, different modular sections are able to be constructed with different thicknesses of some components to vary the strength and weight of that modular section while still having the same interface to allow flexible interconnection of any of the modular sections to any other modular section. The ability to flexibly arrange modular sections allows efficient construction of towers in a manner that facilitates selectively altering the tower's height, strength profile along its height, other features, or combinations of these, as needed to, for example, adapt to actual conditions that are present at a particular installation site for the particular tower.

In an example, the below described towers are lattice masts that are constructed of modular sections where each modular section forms a space lattice structure. A tower in an example is constructed by assembling a desired number of such modular sections into a tower that has an overall length according to the design objectives of its particular installation location. Such a tower consisting of a number of connected together modular sections, where each modular section forms a space lattice structure, is able to function in a manner similar to a conventional pole tower. The below described towers readily allow for onsite adjustments to the finished tower's height, embedded portion length or surface characteristics, strength, other structural characteristics, or combinations of these to accommodate, for example, encountering different soil conditions that were anticipated during the design phase.

In the following discussion, a horizontal direction with respect to a tower or modular section refers to a direction perpendicular to the vertical axis of an installed tower and a plan view cross section of a modular section or a tower is a cross-section parallel to the horizontal direction and that is perpendicular to the vertical axis of the installed tower. Vertical and horizontal directions refer to the orientation of a component or modular section when it is in an installed tower regardless of the orientation of the component or modular section prior to installation of the completed tower.

A vertical direction with respect to a tower or modular section refers to a direction that is in line or parallel to the vertical axis of an installed tower and an elevation view cross section is a cross-section that is oriented in a vertical direction relative to the installed tower, i.e., a cross-section in line with or parallel to the vertical axis of the installed tower. An elevation view is a view of the elevation view cross section.

In the following description, a description of a quantity as being similar, substantially similar, equal, or substantially equal, for two or more components is to be understood to mean that the values of those quantities for those elements are within a tolerance of each other. Such tolerances are able to be determined by any suitable technique given the use of those elements, the applications for which those elements are to be used, or components into which those elements will be incorporated. Such equality or similarities apply to specification of quantities such as, but not limited to, lengths, thicknesses, sizes, other quantities, or combinations of these.

The modular structures in some examples are constructed with a quadrilateral plan view cross section that is able to be square, rectangular, with plan view shapes defining other polygons with any number of sides, or with combinations of these. Although the below described examples depict modular structures with square cross sections, it is clear that the below described principles are applicable to modular structures that have any quadrilateral plan view cross section where not all sides are of equal length. In some examples, all modular sections used to construct a tower, or at least a portion of a tower, have plan view cross sections that have substantially similar total width, e.g. plan view cross sections that have equal plan view cross section outer dimensions which is to be understood as where those outer dimensions are equal to within a tolerance. In some examples, modular sections have plan view cross sections that form geometric shapes with corners that are arranged parallel to one another in a vertical direction over the vertical height of the modular section. In other words, such modular sections do not have a taper in their plan view cross section over the vertical height, and thus have no taper in the elevation view, of that modular section.

In further examples, a tower is able to include some portions that have modular structures with plan view cross section dimensions that have a different total width than modular structures in other portions of that tower. For example, a tower is able to have lower portions that have a wider total horizontal width that portions above that lower portion. For example, a particular tower may have a lower above ground portion that has a five foot by five foot (5×5 foot) cross section and an upper above ground portion that has a four by four foot (4×4 foot) cross section that attaches to the top of the upper 5×5 foot cross section. Attachment of modular sections with different cross sections is able to be achieved by any suitable technique, such as an interface section with opposite ends adapted to attach to cross sections of differing widths.

The modular structures in some examples have a quadrilateral elevation view cross section that is elongated in the vertical direction relative to the plan view cross section so as to form a vertical structural component. In some examples, all modular sections are able to have elevation view cross sections that have substantially similar total height, e.g., vertical dimensions that are substantially similar to one another within a tolerance. In some examples, modular sections are able to have different elevation view cross sections and vertical heights while maintaining equal plan view cross sections and horizontal outer dimensions.

The use of modular sections that all have consistent plan view cross-sections facilitates attaching together the ends of any two modular section. The ability to attach any two modular sections together simplifies supply chain and inventory maintenance for construction of a series of towers. The total vertical length of a tower, which is the sum of the height of the tower above the ground and the depth, if any, of an embedded or buried part of the tower, is able to be lengthened or shortened to accommodate conditions at a particular installation site. The strength profile along the length of the multiple modular sections of a tower is also able to be modified or redefined during design or construction by allowing modular sections of different strengths to be placed at any selected location in the tower as the tower is being assembled.

In some examples, the modular sections are designed to all have a substantially similar arrangement of component parts. In some examples, each modular section is constructed with a square plan view cross section that has a corner strut in the form of a structural angle on each corner. In the following discussion, a structural angle refers to a structural component that is straight and has a generally "L" shaped plan view cross section with two flat strips running along its vertical length that are joined at an edge of the structural component to form a right angle. In some examples, each corner of the plan view cross section of each modular section is formed of structural angles that all have the same vertical height. In some examples, the plan view cross section of the structural angles have equal length legs extending horizontally from the right angle junction. In some examples, the strength of a particular modular section is varied by selecting the thickness or gauge of the material from which the structural angle is made.

The corner struts, e.g., structural angles, at the four corners of the plan view cross section of each modular section are connected by cross bracing elements that form a lattice at least in part on or near the perimeter of the plan view cross section. In some examples, cross bracing elements are able to be attached to the inside or outside of structural angles forming the corners of the plan view cross section. In some examples, these cross bracing elements all have the same length and gauge or thickness. In further examples, modular sections of substantially similar strength are all able to use cross bracing elements of substantially the same length and gauge or thickness while modular sections of different strengths are able to have variability in the strength, length, arrangement, other characteristics, or combination of these, between two modular sections of differing strength. Using cross bracing elements of the same length and gauge or thickness to construct similar modular segments simplifies the supply chain and manufacturing logistics of constructing the modular sections. Using cross bracing elements of the same length and gauge also simplifies logistics of constructing individual modular sections at or near an installation site to, for example, accommodate changes in the designs of individual towers, simplifies management of surplus materials and results in greater flexibility due to having fewer different components that are more fungible in the construction of various modular sections.

In some examples, the modular sections and the components used to join them are designed so that they can all be constructed with components that are selected from a small number of readily available shapes. In some examples, the modular sections are constructed of materials that are readily available in standard shapes and sizes. In an example, standard shapes defined by the American Society for Testing and Materials (ASTM), or equivalent, are used. The use of such standard shapes allows the below described towers to be constructed with materials that can be obtained with relatively short lead times, particular in contrast to many conventional support tower solutions. In further examples, modular sections are able to be made of any suitable material such as various alloys, treated metals, raw metals, composite materials, other materials, or combinations of these.

As described below, the strength of each modular section in a tower is able to be set by constructing that modular section with steel components of differing strength. In some examples, the gauge or thickness of steel used in a particular modular section is able to be selected to provide stronger modular sections, which use some steel components that are thicker, or weaker modular sections, which use some steel components that are thinner. An assembled and installed tower is able to be self supporting or further supported by guy wires.

In various examples, the below described towers provide variability in the design of their subsurface structure in order to tailor the embedment of the tower and how the embedded portion interacts with the soil conditions. Depending on soil conditions, an installed tower is able to have an embedded portion that consist of standardized modular sections that are directly embedded into the ground. In locations where soil conditions, either pre-existing soil conditions or conditions in a bored hole filled with different materials, are sufficient to adequately secure a lattice structure, the embedded portion of the tower is able to be directly buried without modification. In locations that would be aided by more surface area of the embedded portion contacting its surrounding material, stitch plates or other cross bracing angles can be added to the lattice structure of a tower's embedded portion to tailor the embedded structure to the soil conditions. In some examples, such stitch plates or other materials are able to be added to parts of or to all of the embedded portion at the installation site or at any time before installation of the tower into the ground. This gives a construction team the ability to adjust in real time to unexpected or unknown soil conditions. This easy reconfiguration of the embedded portion contrasts with the difficulties of using a conventional single monopole structure as the entire tower structure designed for a particular installation or project in another installation or project because of the discrete heights, embedment, and capacities of such a single monopole structure that is specified for a particular project. In contrast, the below described modular sections are able to be easily used or reused for different towers or even different projects because of their uniform characteristics.

The height of the below described towers is able to be adjusted by adding or removing one or more modular sections from the number of modular sections originally called for by a particular design. The use in some examples of modular sections that all have the same cross section allows modular sections to be added or replaced as part of an initial design or as part of a redesign due to changing installation conditions at the installation site due to any reason at any time. The structural capacity of a tower is able to be adjusted by adding steel, in the form of additional braces or other elements, to one or more modular sections, or one or more modular sections are able to be replaced by stronger modular sections such as ones with structural angles made of material of different thickness. In an application of support towers for a line, one or more line attachment structures that, in an example, include insulators or other attachment devices or the like, are able to depend from portions of the tower by, e.g., being attached to points on the tower. A particular tower design is able to accommodate multiple voltages by adjusting distances between line attachment structures that are attached to the tower.

In some examples, the below described towers are able to support the economical and efficient stockpiling spare material for a project to account for design changes that may be brought about at any time during the project's design and installation lifecycle. For example, an inventory of standard size components such as structural angles, cross bracing elements, and joint elements can be procured, stored, distributed, otherwise handled, or a combination of these, in order to support current and future manufacturing, installation, maintenance, and other needs as they arise. The use of a limited number of standardized elements, such as structural angle corner elements and cross bracing elements to connect those structural angle corner elements, to construct modular sections that all have substantially the same plan view cross section and end interfaces facilitates easy connection of any modular sections to one another and allows unused spare material to be used for other projects. This results in allowing different types of structures to be made from substantially similar component shapes in a way that allows fungibility between those various types of structures and the need to procure less spare material in general. For example, unused spare materials, which can include any combination of completed modular sections, elements used to construct those modular sections, elements used to join modular sections, or combinations of those, can be shipped to another project for use, or the materials can be shipped to an offsite storage location for use on future projects.

The modular sections in some examples of the below described towers are manufactured by assembling metal components where some of those metal components that are used in different modular sections have standardized sizes and also have pre-drilled holes at standardized locations. The fabrication of the components in some examples typically does not involve bending or complicated manufacturing steps. The use of such standardized components allows the ready and economic production of modular sections by a wide variety of suppliers and fabrication contractors. The use of such standardized components that are readily manufactured by simple techniques allows modular sections to be produced in relatively short order in response to, for example, an unexpected demand by an ongoing project being installed. Producing such modular sections is also able to be performed at or near installation sites for the towers being installed. The relatively straightforward construction of each modular section with readily available components is also able to allow the procurement of such modular sections with short lead times relative to conventional support towers.

Installation of the below described towers into difficult to access areas is able to be facilitated by breaking down each tower for transportation into portions that each consist of one or more modular sections. Such portions, or in some cases individual modular sections, are able to be placed onto pallets for transportation. In an example, transportation of the modular sections is facilitated by their design where each modular section is able to be four (4) feet wide or less. In some examples, approximately 200' of pre-assembled portions of a tower are able to be broken down into shorter sections and shipped on a flatbed trailer from a manufacturer. Once a tower is assembled, the below described towers in some examples are able to be erected and installed at various locations by a helicopter.

FIG. 1 illustrates an example of an installed line portion 100, according to an example. The installed line portion 100 depicts a line 150 that is installed in an example land area 118 where the example land area includes a flat area 112, a first hill 114 and a second hill 116. The line 150 is able to be any line, such as an electric power transmission line, an electric power distribution line, other lines, or combinations of these such as transmission and distribution lines that are carried by a shared tower. The line 150 depicts a conductor bundle 120 that is supported by a first tower 102, a second tower 104, a third tower 106, a fourth tower 108, and a fifth tower 110. The conductor bundle 120 extends beyond the first tower 102 and the fifth tower 110 to other towers (not shown) to form an electrical connection between two or more locations (not shown). Although the conductor bundle 120 is shown as a single line, it is to be understood that the conductor bundle 120 in an installed system is able to consist of a number of conductors, such as a combination of three (3) or six (6) conductors to convey three-phase power. It is to be understood that the installed line portion 100 is not to scale and is a schematic representation of elements of a line to facilitate the explanation of the towers used therein.

The illustrated towers are shown to rise to different heights above the ground to accommodate the particular conditions that are present at each tower's particular location. As described in further detail below, each modular support tower is able to be constructed of a selected number of modular sections in order to build a support tower with different heights. The number of modular sections to be used in a particular support tower is able to be selected and changed at any time up to and including the time of installation of the support tower at its geographical location.

In order to more clearly describe relevant aspects of the described installation, the depictions of the support towers in the illustrated installed line portion 100 depicts support towers with varying number of portions. In this illustration, each of the depicted portions may include a number of modular sections from which the entire support tower is constructed.

The first tower 102 is located on the flat area 112 and is shown to have three (3) portions in order to place the conductor bundle 120 at a nominal height above the surrounding ground. The second tower 104 is located in a depression of the land between the flat area 112 and the first hill 114. In order to better accommodate the land surrounding the depression where the second tower 104 is located, the second tower 104 is constructed of four (4) portions to make it taller than the first tower 102.

The third tower 106 is located on top of the first hill 114 and thus is able to have a reduced height of two (2) portions to accommodate the land contour conditions at this location. The lower height of the third tower 106 is reflected by the use of two portions. The fourth tower 108 is located in a depressed area and has increased height of four (4) portions. The fifth tower 110 is located in a fairly flat area of the second hill 116 and thus has a nominal height of three (3) portions.

As described in further detail below, the towers described herein are constructed of modular sections with a design that allows for alterations of their height by simply adding or removing modular sections from the initially envisioned tower design. These alterations to the height of the towers are able to be made at any time, such as during initial design of the line 150 or up to and including the time that the towers are prepared for installation at their installation location.

An example of a situation that will cause an alteration in a tower to be made includes the occurrence of changes that can happen during construction such as new constraints that result in changes to the location of the installation of a tower structure. Movement of a tower's installation location may cause the installation location move up onto a hill or down into a valley. Such changes may result changes to the height of a tower to accommodate the altered elevation of the installation location, changes in soil conditions, changes in other factors, or combinations of these that can be accommodated by alteration in the height or other characteristics of the tower.

Figure 2:
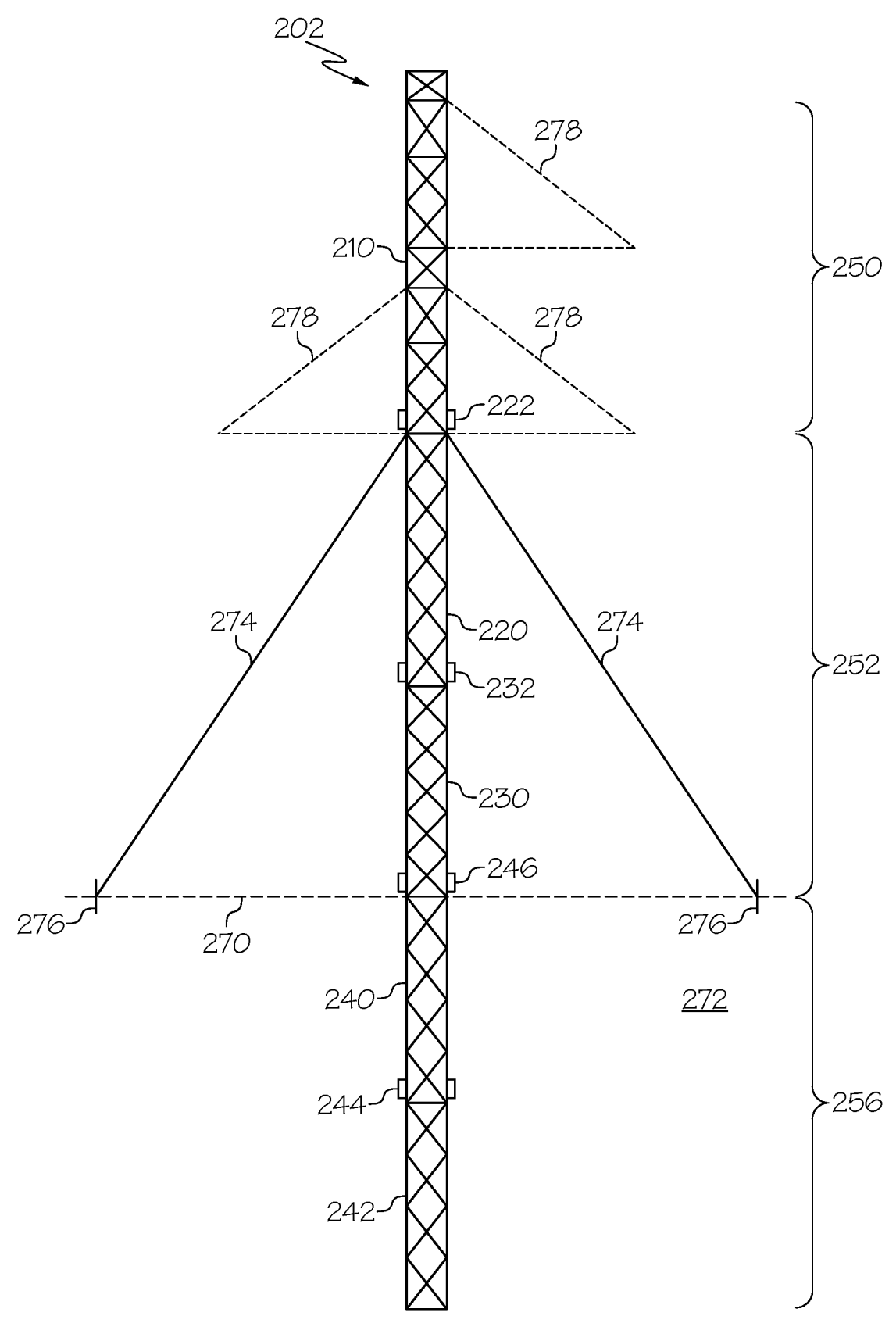
FIG. 2 illustrates an example tower, according to an example.

FIG. 2 illustrates an example tower 200, according to an example. The illustrated example tower 200 depicts an assembly of modular sections 202 with a number of modular sections arranged in a linear sequence. The assembly of modular sections 202 consists of a tower top structure 250, an above ground portion 252 that in this example consists of two (2) above ground modular sections, and an embedded portion 256 that in this example contains two (2) modular sections that are embedded into the ground 272. In general, a similar tower is able to be assembled by combining any suitable number of modular sections according to the design goals of the project and conditions at the installation location for that particular tower.

In the illustrated example, the tower top structure 250 is mounted at the top of the assembly of modular sections 202 and includes line attachment structures 278 to support the attachment of various lines such as electrical transmission or distribution lines, telephone lines, other lines, or the like, that are to be supported by a tower containing the assembly of modular sections 202. In an example, the tower top structure 250 is itself constructed of various modular sections to facilitate its construction. In various examples, such line attachment structures are able to take any form and in some examples are able depend from any portion of a tower by being placed anywhere along the assembly of modular sections 202 that is above the ground. Further examples are able to have an assembly of modular sections that have two or more line attachment structures of similar or different design attached to various locations on the assembly of modular sections 202 or on other structures attached thereto. In some examples, the tower top structure 250 is also able to include ground wire supports at its top end.

In some examples, modular sections are able to be constructed that have different strengths. In an example, an individual modular section is able to be constructed of metal, such as steel or other alloys, that has a thickness selected from one of several thicknesses. Weaker modular sections are constructed of metal components where some or all of the components have a thinner gauge but otherwise have the same or substantially similar dimensions as stronger modular sections. The use in some examples of uniform dimensions of modular sections except for the gauge or thickness of some or all of the components of those modular sections allows the interchangeable arrangement of modular sections with different strengths to achieve the design goals of a particular installation. For example, all modular sections in some examples are a space lattice structure that has corner struts having substantially similar horizontal dimensions and different strengths that are realized by being constructed of metal with different gauges.

In some examples, each modular section in an assembly of modular sections 202 all have a substantially similar outside dimensions in a horizontal direction, which is a dimension perpendicular to the vertical orientation of an installed assembly of modular sections, and all have substantially similar dimensions in a vertical direction, which is parallel to the vertical orientation of the installed assembly of modular sections. In an example, the vertical dimension is longer than the horizontal dimension. In other words, all modular sections have plan view cross sections that have corners formed by elements that are parallel to one another in the vertical direction and thus have no taper in their plan view cross section along the vertical direction.

The above ground portion 252 includes a lower modular section 230 and an upper modular section 220. The embedded portion 256 includes an upper embedded modular section 240 and a lower embedded modular section 242. In the illustrated example, the assembly of modular sections 202 uses modular sections with different levels of strength in order to achieve the design objectives of the particular tower being constructed. The lower modular section 230 in this example is a stronger modular section than the upper modular section 220. In this example, the lower modular section 230 is constructed of components, such as steel, with greater thickness, strength, other characteristics, or combinations of these, than corresponding components in the upper modular section 220. In the illustrated example, the lower modular section also has a denser lattice structure, i.e., there are more cross bracing members over the vertical height of the modular section, than the lattice structure of the upper modular section 220. This structure is an example of where at least one lower modular section in the above ground portion comprises a stronger structure than a modular section that is above the at least one lower modular section.

The assembly of modular sections 202 includes an embedded portion 256. The embedded portion 256 in this example consists of two (2) modular sections including a upper embedded modular section 240 and a lower embedded modular section 242. The embedded portion 256 is shown to be embedded below a surface 270 of the ground 272. In general, the embedded portion 256 is able to have any number of modular sections as is determined to meet the design objectives to support the assembly of modular sections 202. In an example, the space lattice structure of the modular sections of the embedded portion 256 are an uncovered space lattice structure that is directly embedded into a ground surface. Different examples of embedded portions are described below.

The modular sections in the assembly of modular sections 202 are connected to adjacent modular sections with joints. The tower top structure 250 is coupled to the top of the upper modular section 220 by a first joint 222 and the bottom of the upper modular section 220 is coupled to the top of the lower modular section 230 by a second joint 232. The top of the upper embedded modular section 240 is coupled to the bottom of the lower modular section 230 by a third joint 246.

The upper embedded modular section 240 is coupled to the top of the second embedded modular section by a fourth joint 244.

In some examples, these joints are substantially similar for all modular sections due to the similarity of outside dimensions of all modular sections used in the assembly of modular sections regardless of the strength of each of those modular sections. In general, modular sections in some examples that are used in the assembly of modular sections 202 are constructed such that each modular section has a first end and a second end that is opposite the first end and both of the first end and the second end is configured to connect to either end of any other modular section. In an example, both ends of each modular section have substantially similar interfaces that each allow interchangeable connection to either end of another modular section.

In some examples, the joints are able to differ to accommodate different loads or other design considerations for the tower being installed. Details of these joints are discussed below.

In the illustrated tower 200, the assembly of modular sections 202 is installed into a location and is further shown to be supported by guy wires 274 that are each attached between a separate anchor point 276 on the ground surface 270 and a point on the assembly of modular sections 202 such as a point on one or more of the tower top structure 250, the above ground portion 252, or both. The illustrated tower 200 depicts guy wires 274 and associated hardware as example components and in general it is to be understood that guy wires with any suitable design are able to be used to support a tower and may deviate from the depicted guy wire installation. In various examples, an installed assembly of modular sections 202 is able to be embedded into the ground and installed as either a self supporting structure or a structure supported by guy wires or other supports. In further examples, an assembly of modular sections is also able to be mounted onto a foundation and extend upwards from that foundation. Examples of such foundations include any type of foundational structure supported by the ground 272 and that has a mounting surface for the assembly of modular sections that is either above the surface 270, below the surface 270, or level with the surface 270. An assembly of modular sections mounted onto a foundation is able to be either self supporting or secured by guy wires or other supports.

Figure 3:
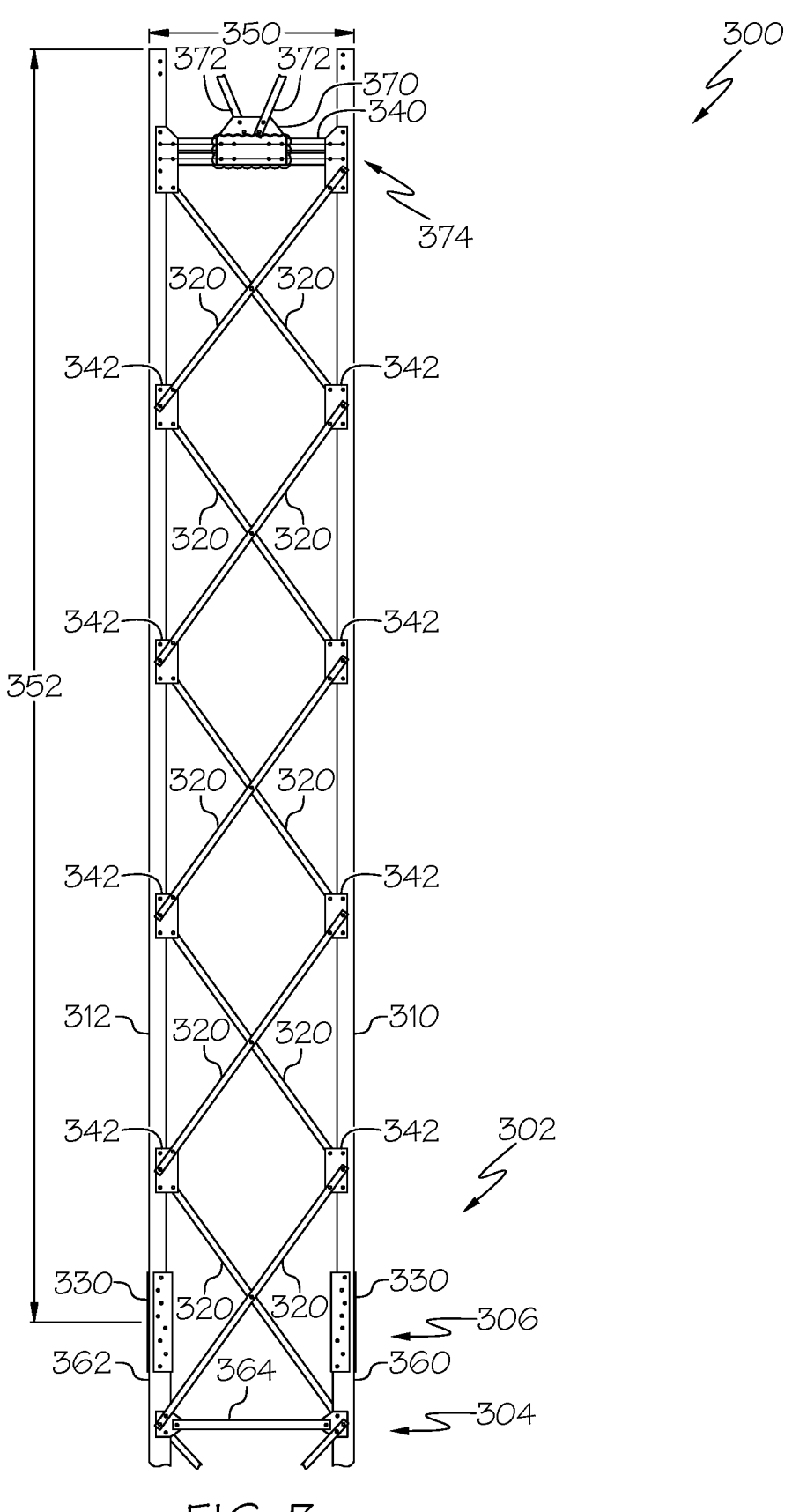
FIG. 3 illustrates a first modular section and joint, according to an example.

FIG. 3 illustrates a first modular section and joint 300, according to an example. The first modular section and joint 300 illustrates an elevation view of an example of a portion of a tower that includes a number of modular sections. The modular section and joint 300 illustrates an example modular section that has components to provide additional strength for that modular section. The modular sections depicted in the first modular section and joint 300 are able to be used as components of a tower such as the above described tower 200.

The first modular section and joint 300 depicts a first modular section 302 and a second modular section 304. The first modular section 302 and the second modular section 304 each has a square plan view cross section and is constructed with four (4) structural angle struts that form the corner of this square plan view cross section. In the illustrated view, the first modular section and joint 300 depicts a first structural angle 310, and a second structural angle 312. Corresponding structural angles are behind the illustrated structural angles and are not shown due to their being obstructed in this view by the illustrated structural angles.

Further details of the plan view cross section of modular structures is discussed below.

The first modular section 302 is shown to have a plan view cross section width 350 and an elevation view height of 352. In some examples the plan view cross section width 350 is four or five feet. In some examples, a number of modular sections are made that all have the same plan view cross section width, to within a tolerance, but have different elevation view heights 352 such as of five (5) feet, ten (10) feet, or twenty (20) feet. In some examples, modular sections connected to one another are able to have equal plan view cross section outer dimensions, where equal plan view cross section outer dimensions is defined as separations between the elements forming the corners of a geometric shape defining the plan view cross section of each modular section that are equal to within a tolerance where that tolerance is determined according to the design goals for the particular tower containing the modular sections. In some examples, multiple modular sections used to construct a tower are also able to have equal elevation view heights, where those modular sections have elevation view heights that are equal to within a tolerance where that tolerance is determined according to the design goals for the particular tower containing the modular sections The structural angles of these modular sections are connected together by cross bracing elements 320. In the illustrated example, the cross bracing elements connect the four structural angles in a manner that creates a lattice space lattice structure. In the illustrated example, the cross bracing elements 320 generally connect the structural angles that are on adjacent corners of the modular section. The first modular section and joint 300 depicts a stronger modular section wherein the cross bracing elements 320 are connected to the structural angles by flanges 342. In some examples, the structural angle elements and the cross bracing elements 320 have pre-drilled holes to receive fasteners at locations on those elements that are designed to allow the ready assembly of those elements into modular sections with physical characteristics defined for the design of those modular sections.

In some examples, as is illustrated for the first modular structure and joint 300, a modular section is able to have one or more horizontal cross bracing structures such as the illustrated first horizontal cross bracing structure 374. The depicted elevation view of the first horizontal cross bracing structure 374 shows an edge strut 340 that runs along the perimeter of the first horizontal cross bracing structure 374. An edge strut flange 370 is attached to the middle of the edge strut 340 and is shown in this example to have two (2) cross bracing elements 372 attached thereto. An example of a plan view of a first horizontal cross bracing structure 374 is described in further below.

The second modular section 304 has a substantially similar cross section and construction as the first modular section 302. The second modular section 304 has a second modular section first structural angle 360 and a second modular section second structural angle 362. The modular section and joint 300 depicts a joint 306 that consist of structural angle connectors 330 attached to an outer surface of the respective interface of the first modular section 302 and the second modular section 304 to join the first modular section 302 to a corresponding end of the second modular section 304. In an example, each end of each corner strut has an interface that is adapted to connect to a joint element such as the illustrated joint or structural angle connector 330, and each joint 306 is adapted to couple interfaces of struts, such as structural angles, of two modular sections. In the illustrated example, the interface includes pre-drilled holes located at each end of each corner strut to accept fasteners that are placed through the joint element.

The joint 306 in this example consists of a number of structural angle connectors 330 with one structural angle connector 330 that is bolted to the ends of adjacent structural angles of the modular sections being joined.

In the illustrated example, the first structural angle 310 is joined to the second modular section first structural angle 360 and the second structural angle 312 is joined to the second modular section second structural angle 362 by respective structural angle connectors 330. The ends of the other structural angles of the first modular section 302 are similarly connected by other structural angle connectors 330 to the ends of corresponding structural angles of the second modular section 304. In various examples, the structural angle connectors 330 are able to have any suitable form such as straight strips with pre-drilled holes to align with pre-drilled holes on the interfaces of the modular sections, structural angle forms with pre-drilled holes to align with pre-drilled holes on the interfaces of the modular sections, other forms or shapes, or combinations of these.

The joint 306 in the illustrated example further has cross bracing elements 320 that connect each structural angle of one modular section to an opposite structural angle of an adjoining modular section. In the illustrated example, a cross bracing elements 320 joins the first structural angle 310 to the second modular section second structural angle 362 across the joint 306 and the second structural angle 312 is joined to the second modular section first structural angle 360 by another cross bracing member. In the illustrated example, the cross bracing members that join the structural angles across the joint 306 attached to one of the modular sections at a point that has a second horizontal cross bracing structure 364.

The components used to construct the modular sections in an example are constructed from standard ASTM steel shapes that are readily available. The ready availability of such components advantageously simplifies the logistics of procuring, stocking, and distributing these components. In some examples, the further processing of these readily available components to prepare them for assembly into modular sections is also limited to simple tasks such as cutting and drilling holes into pre-defined locations on those components.

Figure 4:
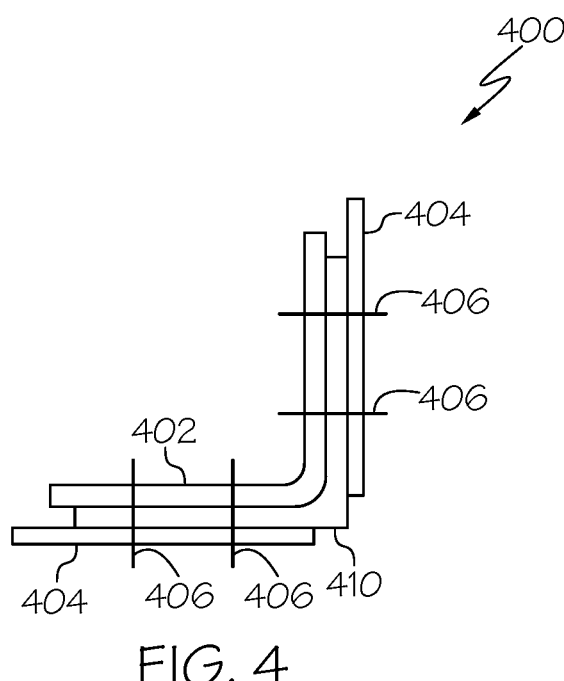
FIG. 4 illustrates a plan view of a joint, according to an example.

FIG. 4 illustrates a plan view of a joint 400, according to an example. The plan view of a joint 400 depicts an example plan view of a connection of structural angle of two adjoining modular sections, such as is discussed above with regards to the structural angle connectors 330 of the joint 306. The description of the plan view of a joint 400 refers to the above description of the first modular section and joint 300.

The plan view of a joint 400 depicts a plan view of a structural angle 410, which corresponds to an example plan view of a structural angle such as the above described first structural angle 310 or the second structural angle 312. The plan view of a joint 400 includes a joint angle 402 that is an angle piece that fits into the interior of the structural angle 410 and extends for a distance along each structural angle being joined on both sides of the interface of those adjoining structural angles of the two modular sections being joined.

The plan view of a joint 400 depicts backing plates 404 that are placed on the outside of each leg of the structural angle 410. The backing plates 404 provide support for fasteners 406 that extend through the backing plates 404, structural angle 410, and joint angle 402. The fasteners 406 attach and secure the backing plates 404, structural angle

410, and joint angle 402 to each other to provide a sufficiently strong coupling of adjacent structural modules according to the design goals for the tower being constructed.

Figure 5:
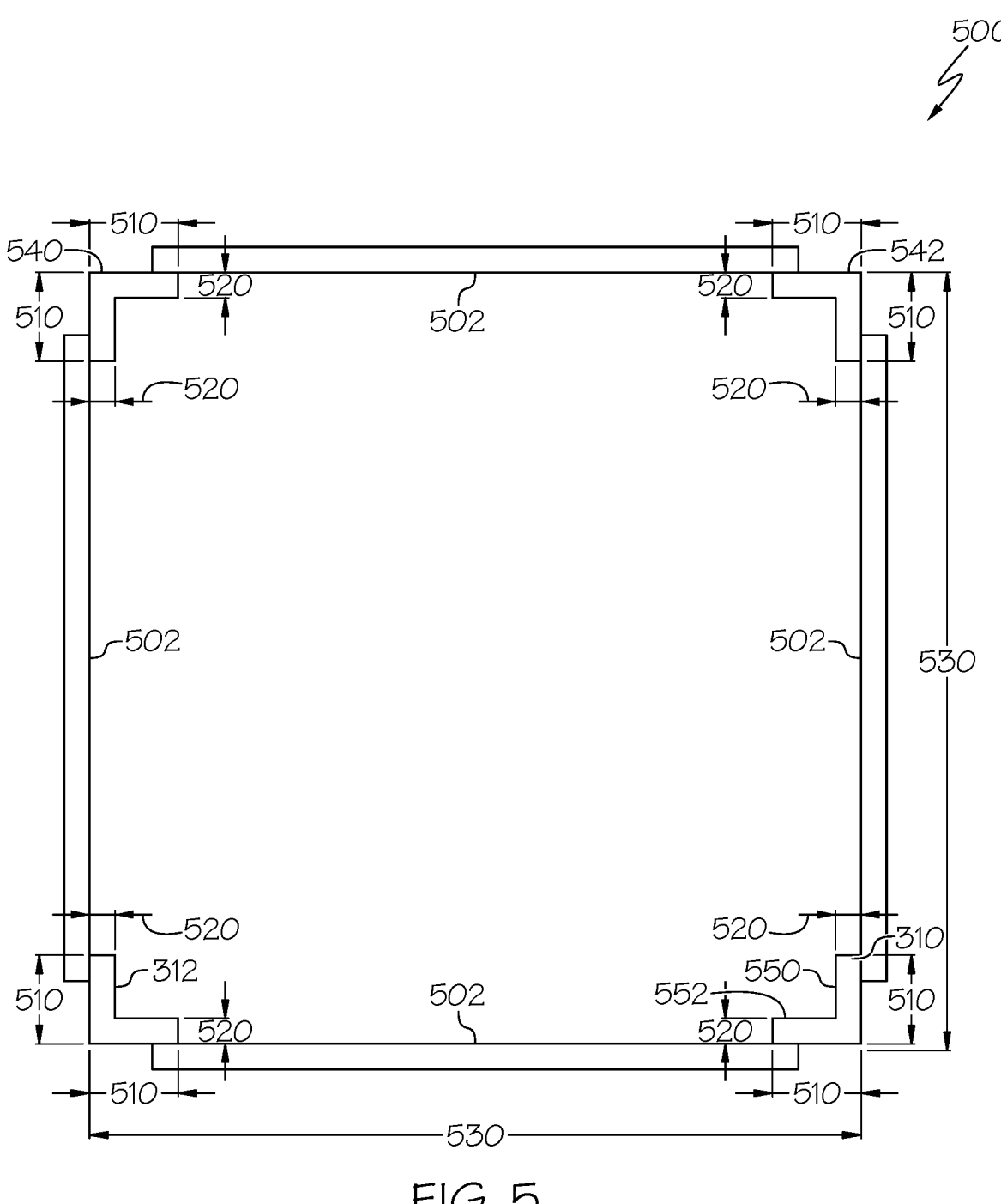
FIG. 5 illustrates a modular section plan view cross section, according to an example.

FIG. 5 illustrates a modular section plan view cross section 500, according to an example. The modular section plan view cross section 500 depicts a view looking up or down from the end of a modular section that is within an assembled and installed tower.

The modular section plan view cross section 500 depicts four structural angles, a first structural angle 310 and a second structural angle 312 that are substantially similar to the structural angles discussed above with regards to the first modular section and joint 300, and a third structural angle 540 and a fourth structural angle 542. These structural angles are attached to adjacent structural angles by cross bracing elements 502, which are substantially similar to the cross bracing elements 320 discussed above. The structural angles are connected with the cross bracing elements 502 as described above so as to have total plan view cross section horizontal length 530 that are within a specified tolerance of the same horizontal length for all four sides of each modular section. In some examples, multiple modular sections are able to have equal plan view outer dimensions, which correspond to the total plan view cross section horizontal length. Such equal plan view outer dimensions are described above.

The structural angles of each modular cross section in an example are able to have substantially similar dimensions in an example other than the thickness or gauge of the metal used to form those structural angles. Using the first structural angle 310 as an example, the first structural angle 310 is shown to have a first leg 550 and a second leg 552 that each has the same horizontal leg length 510, to within a specified tolerance. The other structural angles also have two legs with this same horizontal leg length, to within a tolerance, in an example.

The structural angles of the modular section plan view cross section 500 are shown to have substantially similar thicknesses to within a specified tolerance. For example, the first structural angle 510 has a thickness 520 for both horizontal legs. As discussed above, structural angles in different classes of modular sections are able to be made with a thickness, or gauge of metal forming the structural angles, that is selected from a limited number of thicknesses. Using structural angles with substantially similar vertical heights and substantially similar horizontal leg lengths for all constructed modular sections, where the structural angles in an example only vary by the thickness or gauge of the metal used to make the structural angle, streamlines the logistics of manufacturing the modular sections including, for example, reducing the inventory of structural angle elements that is needed to meet varying demands for towers. Each structural angle in a particular modular section in an example has the same thickness, to within a tolerance.

Figure 6:
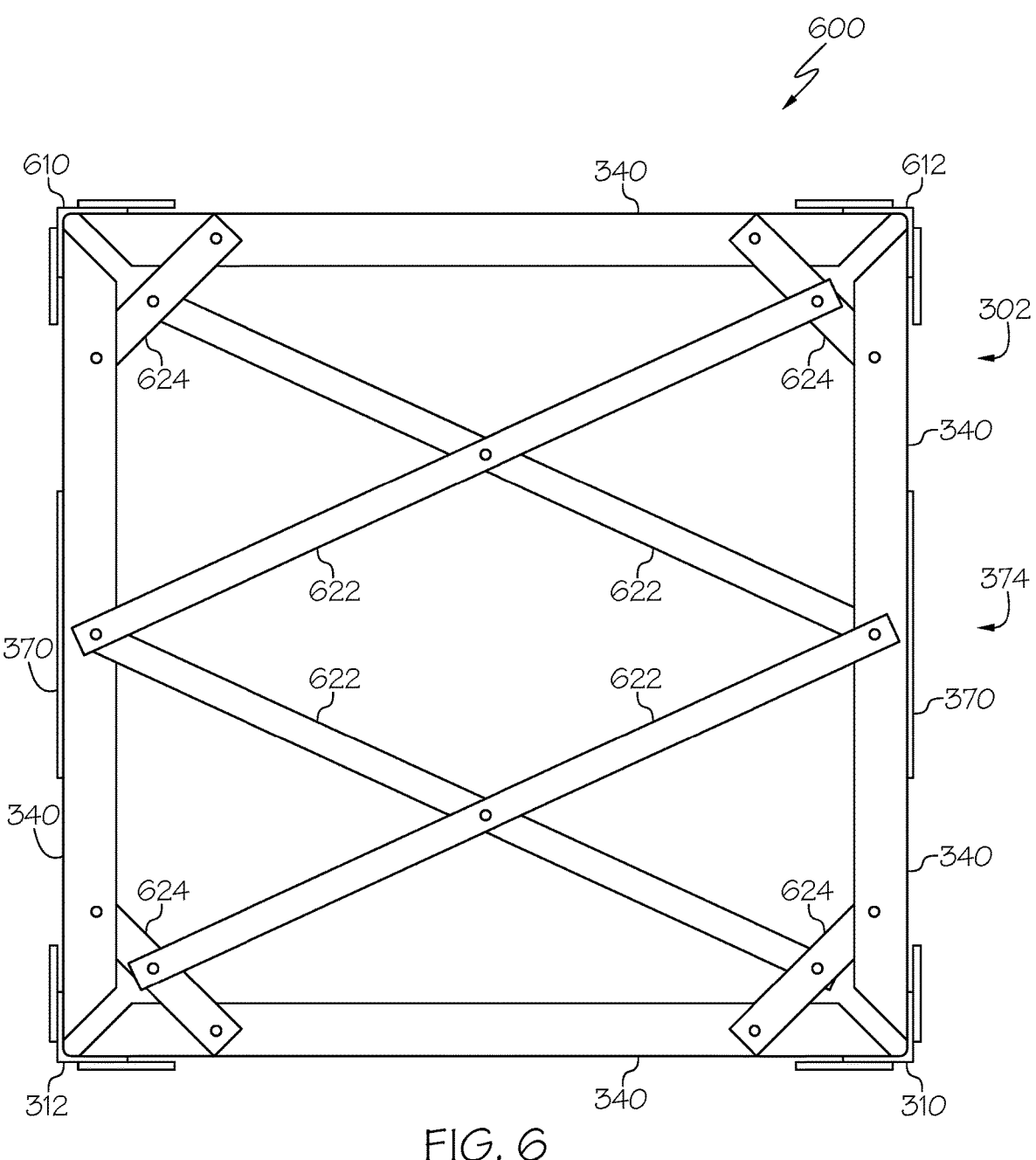
FIG. 6 illustrates a plan view of a horizontal cross bracing structure, according to an example.

FIG. 6 illustrates a plan view of a horizontal cross bracing structure 600, according to an example. The plan view of a horizontal cross bracing structure 600 depicts an example of the above described first horizontal cross bracing structure 374. The description of the plan view of a horizontal cross bracing structure 600 refers to the above description of the first modular section and joint 300.

The plan view of a horizontal cross bracing structure 600 depicts the first horizontal cross bracing structure 374 with the four (4) structural angles that form the corners of the plan view of the first modular section 302, i.e., the first structural angle 310, the second structural angle 312, a third structural angle 610, and a fourth structural angle 612.

The plan view of a horizontal cross bracing structure 600 depicts perimeter edge struts 340 that run along the outer perimeter of the first modular section 302 and connect adjacent structural angles to one another. In some examples, the perimeter edge struts 340 are able to have various cross sections such as being structural angles to provide an amount of strength that meets the design objectives for a particular installation.

The plan view of a horizontal cross bracing structure 600 further depicts internal cross bracing elements 622 that in the illustrated example are within the first modular section 302 and that connect between a mid-point of each perimeter cross bracing element 620 and brackets 624 mounted adjacent to each structural angle.

Figure 7:
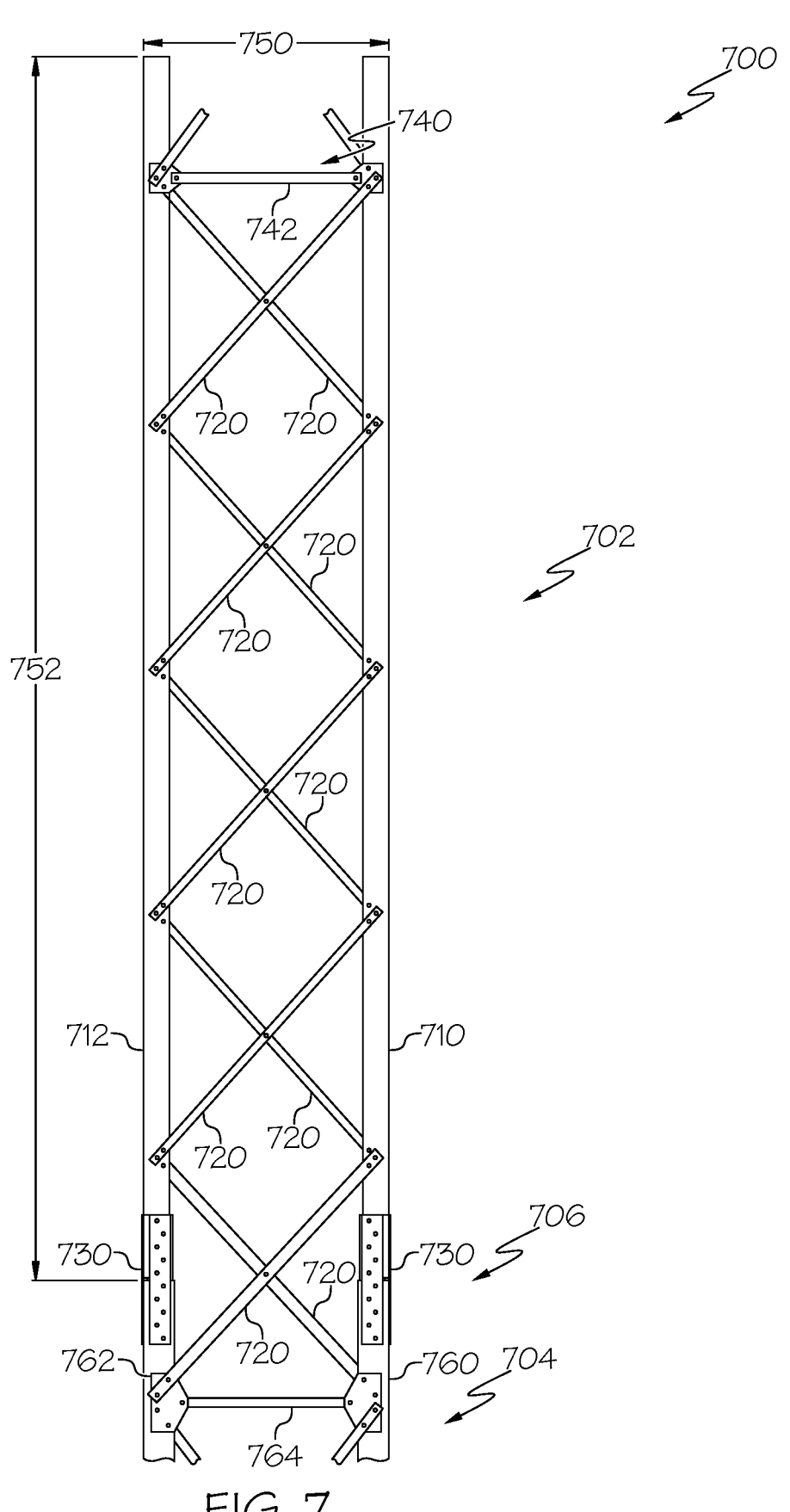
FIG. 7 illustrates a second modular section and joint, according to an example.

FIG. 7 illustrates a second modular section and joint 700, according to an example. The second modular section and joint 700 is substantially similar to the above described first modular section and joint 300 and includes similar characteristics as are described above with regards to the first modular section and joint 300 except as presented below. The second modular section and joint 700 illustrates an example of a portion of a tower that includes a number of modular sections that have components to create a modular section with less strength than the modular section described for the first modular section and joint 300. The modular sections depicted in the second modular section and joint 700 are able to be used as components of a tower such as the above described tower 200.

The second modular section and joint 700 depicts an elevation view of a first lighter modular section 702 and a second lighter modular section 704. The first lighter modular section 702 and the second lighter modular section 704 have less strength than the modular sections described in the first modular section and joint 300, but these modular sections are lighter weight and may be more suitable, for example, as modular sections to be installed higher up in a tower.

The second modular section and joint 700 has a square plan view cross section and is constructed with four (4) structural angle struts that form the corner of this square plan view cross section. In the illustrated view, the second modular section and joint 700 depicts a first lighter structural angle 710, and a second lighter structural angle 712. Corresponding structural angles are behind the illustrated structural angles and are not shown due to their view being obstructed by the illustrated structural angles. In an example, the structural angle struts of the modular sections depicted in the second modular section and joint 700 are made of a thinner gauge of metal that the structural angle struts depicted in the modular section and joint 300 but other dimensions of the structural angle struts, such as leg length and vertical height, are substantially similar.

The first lighter modular section 702 is shown to have a plan view cross section width 750 and an elevation view height of 752. In some examples the plan view cross section width 750 is four or five feet. In some examples, a number of modular sections are made that all have the same plan view cross section width, to within a tolerance, but have different elevation view heights 752 such as of five (5) feet, ten (10) feet, or twenty (20) feet.

The structural angles of these modular sections are connected together by cross bracing elements 720. In the illustrated example, the cross bracing elements connect the four structural angles in a manner that creates a lattice space lattice structure. The second modular section and joint 700 depicts a lower strength modular section wherein the cross bracing elements 720 are connected directly to the structural angles. In some examples, the structural angle elements and the cross bracing elements 720 have pre-drilled holes to receive fasteners at locations on those elements that are designed to allow the ready assembly of those elements into modular sections with physical characteristics defined for the design of those modular sections.

In the illustrated example, the cross bracing elements 720 generally connect the structural angles that are on adjacent corners of the modular section. In some examples, as is illustrated for the first modular structure and joint 700, a modular section is able to have one or more horizontal cross bracing structure such as the illustrated first horizontal lighter cross bracing structure 740. The second modular section and joint 700 depicts an edge strut 742 of the first horizontal lighter cross bracing structure 740. An example of a plan view of the first horizontal lighter cross bracing structure 740 is described below.

The second lighter modular section 704 has a substantially similar cross section and construction as the first lighter modular section 702. The second modular section 704 has a second modular section first lighter structural angle 760 and a second modular section second lighter structural angle 762. The modular section and joint 700 depicts a joint 706 that consist of structural angle connectors 730 attached to an outer surface of the respective interface of the first lighter modular section 702 and the second lighter modular section 704 to join the first lighter modular section 702 to a corresponding end of the second lighter modular section 704. In an example, each end of each corner strut has an interface that is adapted to connect to a joint element such as the illustrated joint or structural angle connector 730. In the illustrated example, the interface includes pre-drilled holes located at each end of each corner strut to accept fasteners that are placed through the joint element.

The joint 706 in this example consists of a number of structural angle connectors 730 with one structural angle connector 730 that is bolted to the ends of adjacent structural angles of the modular sections being joined. In an example, the structural angle connectors 730 has a structure substantially similar to that described above with regards to the plan view of a joint 400.

In the illustrated example, the first lighter structural angle 710 is joined to the second modular section first lighter structural angle 760 and the second lighter structural angle 712 is joined to the second modular section second lighter structural angle 762 by respective structural angle connectors. The ends of the other structural angles of the first lighter modular section 702 are similarly connected by other structural angle connectors 730 to the ends of corresponding structural angles of the second lighter modular section 704. In various examples, the structural angle connectors 730 are able to have any suitable form such as straight strips with pre-drilled holes to align with pre-drilled holes on the interfaces of the modular sections, structural angle forms with pre-drilled holes to align with pre-drilled holes on the interfaces of the modular sections, other forms or shapes, or combinations of these.

The joint 706 in the illustrated example further has cross bracing elements 720 that connect each structural angle of one modular section to an opposite structural angle of an adjoining modular section. In the illustrated example, a cross bracing elements 720 joins the first lighter structural angle 710 to the second modular section second lighter structural angle 762 across the joint 706 and the second lighter structural angle 712 is joined to the second modular section first lighter structural angle 760 by another cross bracing member. In the illustrated example, the cross bracing members that join the structural angles across the joint 706 attached to one of the modular sections at a point that has a second horizontal lighter cross bracing structure 764.

As discussed above with regards to the first modular section and joint 300, the components used to construct the modular sections in an example are constructed from standard ASTM steel shapes that are readily available. In some examples, some of the components used to construct the modular sections or joint elements depicted for the first modular section and joint 300 are interchangeable with corresponding components in the second modular section and joint 700. For example, some components are able to be made of substantially similar sized metal parts. In an example, the structural angles depicted in the first modular section and joint 300 and the second modular section and joint 700 are made of different gauge metal but have otherwise substantially similar dimensions within a tolerance.

The ready availability of such components and the interchangeability of some components used to assembly modular sections of different weight and strengths advantageously simplifies the logistics of procuring, stocking, and distributing these components. In some examples, the further processing of these readily available components to prepare them for assembly into modular sections is also limited to simple tasks such as cutting and drilling holes into predefined locations on those components.

Figure 8:
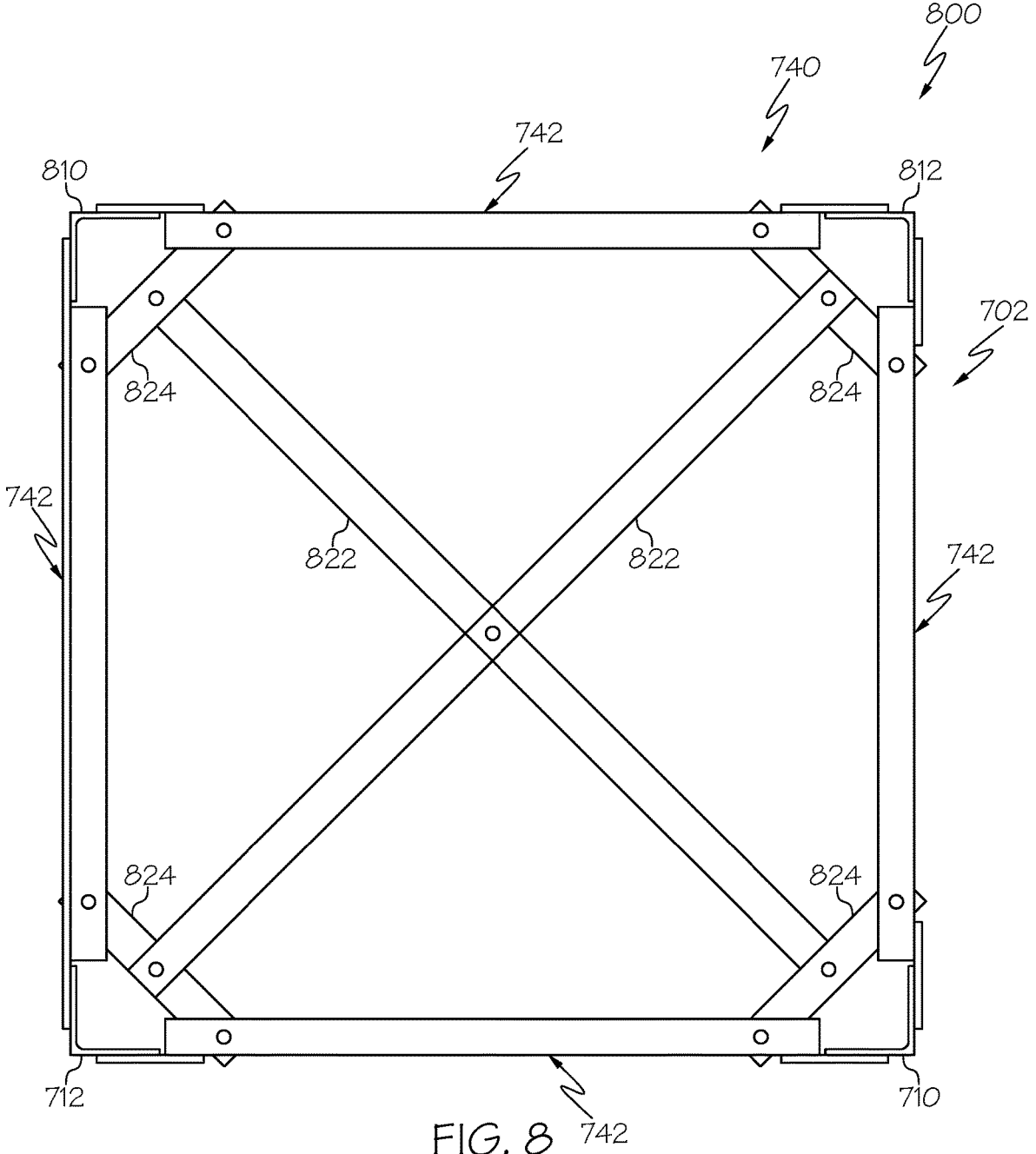
FIG. 8 illustrates a plan view of a lighter horizontal cross bracing structure, according to an example.

FIG. 8 illustrates a plan view of a lighter horizontal cross bracing structure 800, according to an example. The plan view of a lighter horizontal cross bracing structure 800 depicts an example of the above described first horizontal lighter cross bracing structure 740, which is also substantially similar to the second horizontal lighter cross bracing structure 764. The description of the plan view of a lighter horizontal cross bracing structure 800 refers to the above description of the second modular section and joint 700. As noted above, the second modular section and joint 700 depicts modular sections that are weaker and lighter than the modular sections depicted in the first modular section and joint 300. As such, the plan view of a lighter horizontal cross bracing structure 800 depicts a weaker but also lighter cross bracing structure.

The plan view of a lighter horizontal cross bracing structure 800 depicts the first horizontal lighter cross bracing structure 740 with the four (4) structural elements that form the corners of the plan view of the first lighter modular section 702, i.e., the first lighter structural angle 710, the second lighter structural angle 712, a third lighter structural angle 810, and a fourth lighter structural angle 812.

The plan view of a horizontal cross bracing structure 800 depicts edge struts 742 that run along the outer perimeter of the first lighter modular section 702 and connect adjacent structural angles to one another. In some examples, the perimeter cross bracing elements 720 are able to have various cross sections such as being rods, strips, or structural angles.

The plan view of a horizontal cross bracing structure 800 further depicts internal cross bracing elements 822 that in the illustrated example are within the first lighter modular section 702 and that horizontally connect across the first lighter modular section 702 between structural angles on opposite sides of the plan view cross section. In the depicted example, the internal lighter cross bracing elements 822 are attached to brackets 824 mounted adjacent to each structural angle.

Figure 9:
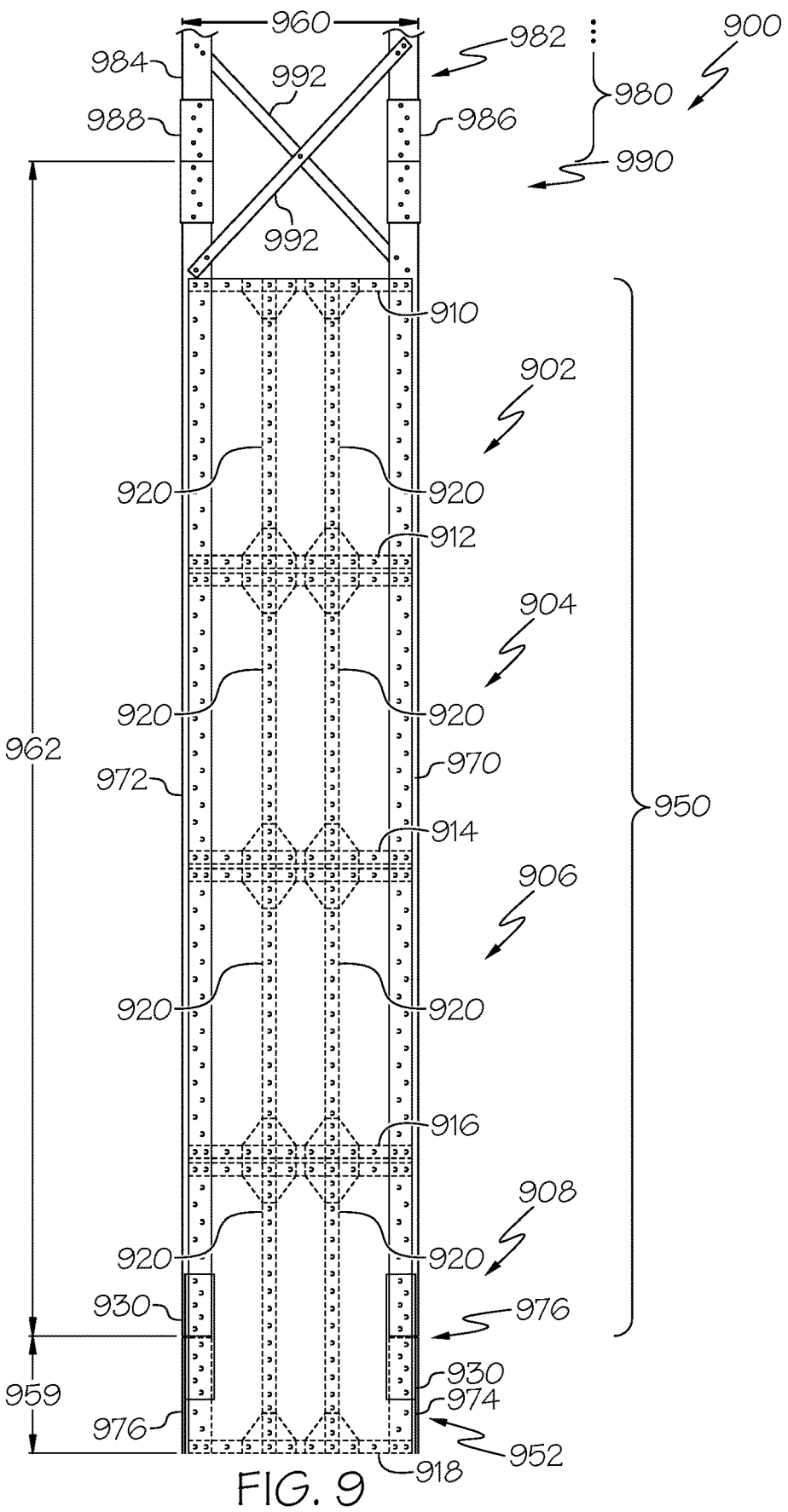
FIG. 9 illustrates a modular section embedded portion, according to an example.

FIG. 9 illustrates a modular section embedded portion 900, according to an example. The modular section embedded portion 900 is an example of an embedded portion 256 discussed above with regards to the example tower 200. The description of the modular section embedded portion 900 refers to the above description of the example tower 200.

The illustrated embedded modular section 950 is an example of a modular section that is designed according to the design goals of a tower. Although the illustrated modular section embedded portion 900 depicts one embedded modular section, it is to be understood that in further examples a tower is able to have an embedded portion 256 that has any number of embedded modular sections 950 according to the design goals of that particular tower. In an example, the embedded portion 256 has equal plan view horizontal outer dimensions as above ground modular sections such that the top modular section of the embedded portion is able to be connected to the bottom of an above ground portion of the tower by a suitable joint. In some examples, embedded modular sections 950 are able to have different cross sections as discussed above with suitable interface sections with opposite ends adapted to attach to the different cross sections.

In some examples, the plan view cross section width 960 is four or five feet. In some examples, a number of modular sections are made that all have the same plan view cross section width 960, to within a tolerance, but have different elevation view heights 962 such as of five (5) feet, ten (10) feet, or twenty (20) feet.

The illustrated embedded modular section 950 has a square plan view cross section that is constructed with four (4) structural angle struts that form the corner of this square plan view cross section. In further examples, embedded modular sections are able to have plan view cross sections that form other geometric shapes. In the illustrated view, the embedded modular section 950 has a first embedded structural angle 970, and a second structural angle 972. Corresponding structural angles are behind the illustrated structural angles and are not shown due to their view being obstructed by the illustrated structural angles.

The structural angles of these modular sections are connected together by horizontal cross bracing elements. The illustrated embedded modular section 950 has four (4) horizontal cross bracing elements, a top horizontal cross bracing element 910, a second horizontal cross bracing element 912, a third horizontal cross bracing element 914, and a fourth horizontal cross bracing element 916. These horizontal cross bracing elements form four lattice cells, a first lattice cell 902, a second lattice cell 904, a third lattice cell 906, and a fourth lattice cell 908.

Although the modular section embedded portion 900 shows an elevation view of only one side of the embedded modular section 950, the embedded modular section 950 has horizontal cross bracing elements on all four sides of its square cross section. In some examples, the horizontal cross bracing elements are able to have plan view cross sections that include further cross members substantially similar to the above described plan view of a horizontal cross bracing structure 600.

The embedded modular section 950 the illustrated example includes a number of vertical bracing elements 920. In the illustrated example, each side of the embedded modular section 950 has two vertical bracing elements 920 that extend between each horizontal cross bracing element. The combination of the vertical bracing elements 920 and the horizontal cross bracing elements form a space lattice structure including the structural angles that form the four corners of the plan view cross section of the embedded modular section 950.

The modular section embedded portion 900 depicts that the embedded modular section 950 is joined to an above ground modular section 980 by a ground level joint 990 and to an end bearing section 952 by an embedded joint 976. In an example, the ground level joint 990 is positioned near the ground in an installed tower and joins embedded sections of the installed tower to the above ground portion of the installed tower. In some examples, the ground level joint 990 is located above the ground, such as by three-to-five (3-5) feet whereby the top of the embedded modular section 950 of the installed tower extends above the ground by that distance.

The above ground modular section 980 has a similar plan view cross section and elevation view construction as the embedded modular section 950. The above ground modular section 980 has an above ground section first structural angle 982 and an above ground section second structural angle 984.

In an example, the above ground modular section 980 is similar to the first lighter modular section 702 and the ground level joint 990 is similar to the joint 706 as were described with regards to the second modular section and joint 700. The ground level joint 990 is shown to have structural angle connectors 986, 988 attached to an outer surface of the respective interface of the embedded modular section 950 and the above ground modular section 980 to join the embedded modular section 950 to a corresponding end of the above ground modular section 980. The ground level joint 990 further includes cross bracing elements 992 that connect each structural angle of one modular section to an opposite structural angle of an adjoining modular section in a manner similar to the above described cross bracing elements 720 in the joint 706 of the second modular section and joint 700.

The joint 976 that joins the embedded modular section 950 to the end bearing section 952 consist of structural angle connectors 930 attached to an outer surface of the respective interface of the embedded modular section 950 and the end bearing section 952 to join those two sections. In an example, each end of each corner strut has an interface that is adapted to connect to a joint element. In the illustrated example, the interface includes pre-drilled holes located at each end of each corner strut to accept fasteners that are placed through the joint element.

The end bearing section 952 has a bottom portion 918 that includes a horizontal cross bracing element similar to those discussed above. The joint 976 in the illustrated example further has two (2) vertical bracing elements 920 that connect the lowest horizontal cross bracing element 916 of the embedded modular section 950 to the bottom portion 918. In the illustrated example, the lattice structure through the joint 976 is substantially similar to the lattice structure in areas within the embedded modular section 950.

The end bearing section 952 is shown to have a plan view cross section width 960, which is substantially similar to the plan view cross section width of the embedded modular section 950, and an end bearing elevation view height of 959. The end bearing section 952 in an example is a shorter section that is attached to the end of a tower structure to provide end bearing resistance for tower. This end bearing resistance is the resistance of the butt end of the tower against the ground to provide vertical support. In an example, the end bearing section 952 has an end bearing elevation view height of one (1) foot. The end bearing section 952 has a bottom portion 918 that provides a suitable horizontal or plan view surface at the bottom end of an assembled tower to provide the vertical resistance according to the design goals of the tower given various factors such as soil conditions and total vertical load. The design of the end bearing section 952 and the bottom portion 918 is able to include any structure according to the design goals of a particular tower, such as a solid flat surface, a surface with or without openings, any other structure, or combinations of these.

As discussed above with regards to the first modular section and joint 300, the components used to construct the embedded modular sections in an example are constructed from standard ASTM steel shapes that are readily available. In some examples, some of the components used to construct the modular sections or joint elements depicted for the first modular section and joint 300 are interchangeable with corresponding components in the modular section embedded portion 900. For example, some components are able to be made of substantially similar sized metal parts. In an example, the structural angles depicted in the first modular section and joint 300 and the modular section embedded portion 900 are made of different gauge metal but have otherwise substantially similar dimensions within a tolerance.

The ready availability of such components and the interchangeability of some components used to assembly modular sections of different weight and strengths advantageously simplifies the logistics of procuring, stocking, and distributing these components. In some examples, the further processing of these readily available components to prepare them for assembly into modular sections is also limited to simple tasks such as cutting and drilling holes into predefined locations on those components.

Figure 10:
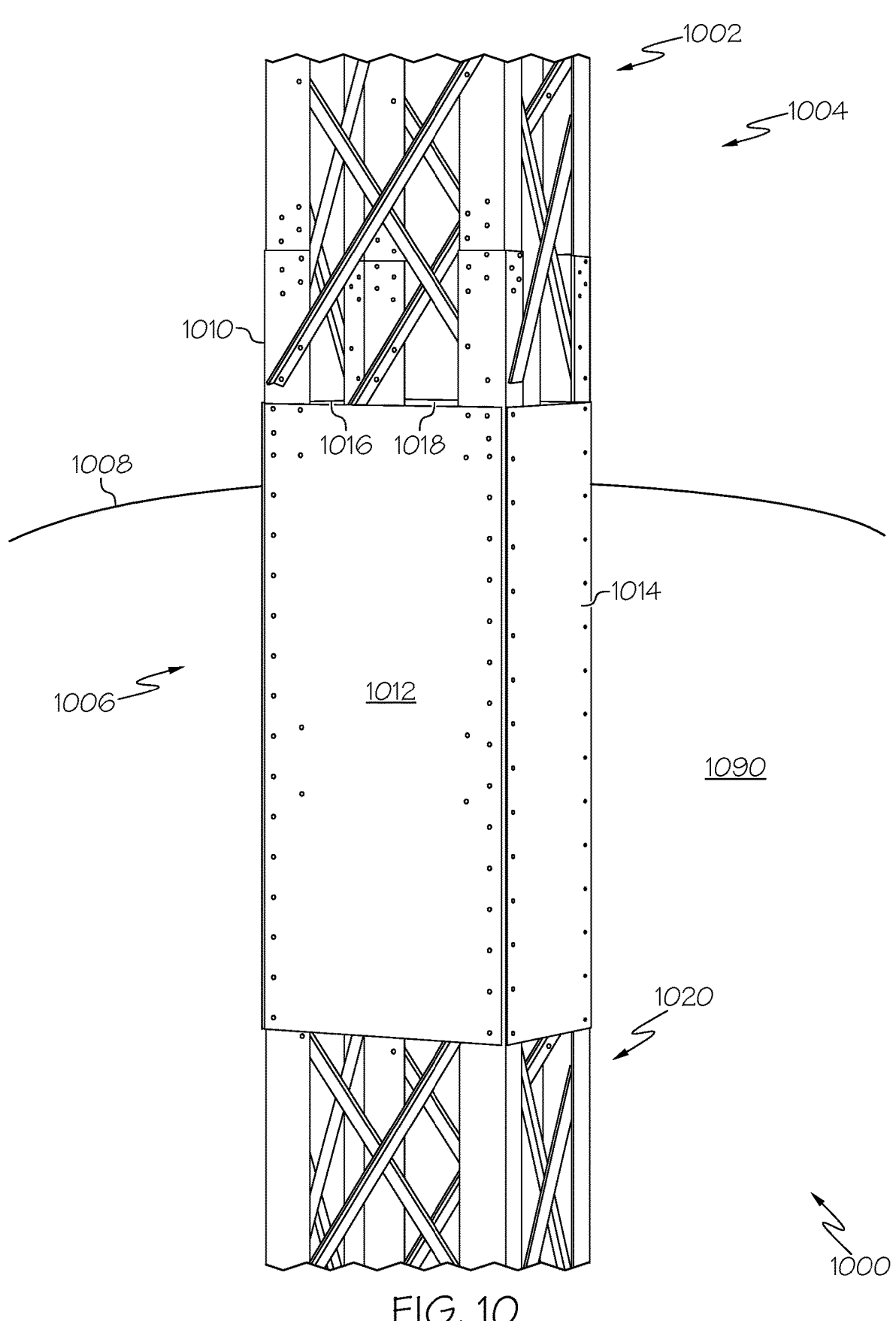
FIG. 10 illustrates an enclosed tower embedded portion, according to an example.

FIG. 10 illustrates an enclosed tower embedded portion 1000, according to an example. The enclosed tower embedded portion 1000 is an alternative example of an embedded portion 256 as discussed above with regards to the example tower 200 or the modular section embedded portion 900. In an example, some or all of the embedded modular portions discussed above with regards to the modular section embedded portion 900, such as one or both of the embedded modular section 950, the end bearing section 952, or both, are able to have stitch plates to enclose those embedded portions as discussed below.

The enclosed tower embedded portion 1000 depicts a tower 1002 that has an embedded portion that is embedded in the ground 1090. The enclosed tower embedded portion 1000 includes an above ground portion 1004 that is above the ground surface 1008 and an embedded portion 1006 that is below the ground surface 1008.

The embedded portion 1006 of the enclosed tower embedded portion 1000 is constructed of a number of modular sections that are connected together as is discussed above. The enclosed tower embedded portion 1000 further includes a number of stitch plates over at least a portion of the external sides of the embedded portion 1006. In an example, the stitch plates are fastened to a structure substantially similar to the above described modular section embedded portion 900. The illustrated combination of stitch plates consists of steel plates forming a closed surface around some or all of the embedded portion 1006. The illustrated embedded portion includes at least one stitch plate enclosing a perimeter around at least a vertical portion of modular sections of the embedded portion. In this context, enclosed is able to include enclosing a vertical perimeter while leaving one or both of the top and bottom of the volume open. In various examples, stitch plates are able to be flat, corrugated, have any surface characteristics or pattern, or combinations of these. In further examples, the stitch plates are able to be constructed of any material.

A first steel plate 1012 and a second steel plate 1014 are shown attached to and covering part of the respective visible sides of the embedded portion 1006. In this example, a third steel plate 1016 and a fourth steel plate 1018 are attached to and covering the other two (2) sides of the modular sections of the embedded portion 1006 that are not visible in this drawing. These stitch plates form a larger surface to interact with the ground 1090 and may be added to the embedded lattice structure to achieve increased support in the ground for the installed tower 1002 given the characteristics of the ground 1090.

The embedded portion 1006 of the illustrated example also has a top unenclosed portion 1010 and a bottom unenclosed portion 1020. The presence or size of these unenclosed portions are able to be selected according to the design objectives for the particular tower installation. In some examples, stitch plates are able to enclose all of the sides of the embedded portion 1006. In some examples, the stitch plates are also able to extend above the ground surface 1008 when the tower 1002 is installed in the ground 1090.

The design of the embedded portion 1006 is able to use various arrangements of stitch plates to augment contact by the vertical face of the embedded portion 1006 in order to achieve the design objectives for that particular tower given the conditions of the ground 1090 at the installation position of that tower. Any combination or arrangement of stitch plates, other cross bracing angles, various types of plates, other structures, or combinations of these are able to be selected to either fully or partially cover the lattice structure of the modular sections that form the embedded portion 1006 of the tower 1002 to achieve the particular design objectives for that tower given the conditions of the ground 1090. In some examples, installation of the tower is able to include boring a hole in the ground 1090 for the embedded portion 1006 and filling the bore with another material to provide a different ground interface with the embedded portion 1006. Such material would contact attached stitch plates and provide more support. In some examples the installation may include filling the interior of the embedded portion which is generally hollow aside from the lattice structures form on its sides.

In further examples, the embedded portion of a tower is able to have additional surface area to interface with the soil or other medium provided by any suitable technique. For example, stitch plates in the form of stitch plates or other cross bracing angles can be added to one or more locations of the embedded portion of the tower to tailor the contact area of the structure to the soil conditions. Stitch plates are able to include components to provide such additional surface area are able to, for example, be attached to elements forming the outline of the cross-section of a modular section, are able to be attached so as to extend beyond the outline of the cross-section of a modular section of the embedded portion of a tower, may have other characteristics and projections relative to the interior or exterior of a modular section of the embedded portion of a tower, or combinations of these.

Figure 11:
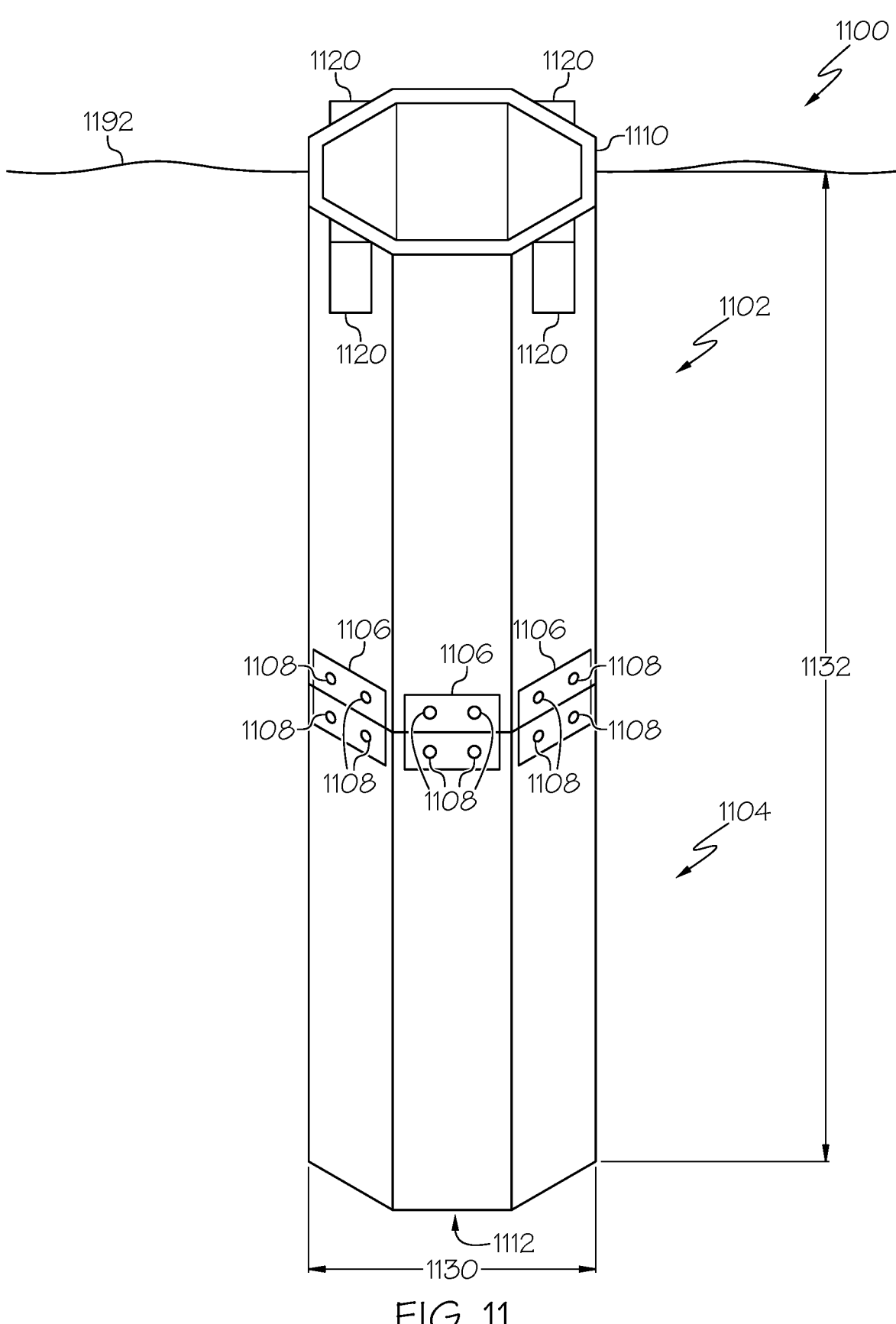
FIG. 11 illustrates an enclosed pole embedded portion, according to an example.

FIG. 11 illustrates an enclosed pole embedded portion 1100, according to an example. The enclosed pole embedded portion 1100 is an alternative example of an embedded portion 256 as discussed above with regards to the example tower 200, the modular section embedded portion 900 or the enclosed tower embedded portion 1000. The enclosed pole embedded portion 1100 depicts an embedded portion that is embedded in the ground 1190.

The enclosed pole embedded portion 1100 depicts an embedded portion of a tower that consists of two (2) monopole structure sections, a first monopole structure section 1102 and a second monopole structure section 1104. Each monopole structure section in an example has a uniform plan view width 1130 and an elevation view height 1132. In an example, the monopole structure sections have plan view widths comparable to the maximum plan view width, e.g., the longest plan view dimension measured diagonally across a quadrilateral plan view cross section, of the above ground tower that mounts thereon.

Monopole structure sections are able to be constructed by any suitable technique. In an example, a flat steel plate is bent so as to be formed into a semi-polygon with the ends welded together to form a monopole structure with vertical walls. In some examples, monopole structure sections are constructed of flat steel plates that are welded together to form vertical walls, or elevation view walls, that form a monopole structure. In an example, each monopole structure section has vertical walls that are parallel in the vertical direction and do not have a taper. In some examples, the monopole structures are able to have a taper, or changing cross section dimensions, at different vertical locations. Such taper is able to be continuous or discontinuous. In some examples, this octagon cross section does not have internal structures. In further examples, a monopole structure is able to have any cross section geometry, structure, or both. A monopole structure in some examples have different number of sides, such as an example with twelve (12) sides instead of the eight (8) sides depicted by the enclosed pole embedded portion 1100.

In an example, one end of a monopole structure section is able to have a bottom plate 1112 to form an end bearing surface for the bottom of the enclosed pole embedded portion 1100. In some examples, all monopole structures are able to have a bottom plate to utilize a uniform design for all monopole structures. In some examples, each monopole structure is able to have a bottom plate on each end to allow interchangeable orientation of each monopole structure segment in a serial assembly of such monopole structures.

The first monopole structure section 1102 in the illustrated example is joined to the second monopole structure section 1104 by joint plates 1106. In the illustrated example, the joint plates 1106 are attached to each monopole structure section by fasteners 1108. In general, two monopole structure sections are able to be joined by any suitable technique according to the design goals for the tower being constructed. The monopole structures sections in an example have plan view outer dimensions, e.g. the uniform plan view width 1130, that are equal to within a tolerance to facilitate the illustrated joining of any two such monopole structures.

The top most monopole structure section in an example has a ground level interface that includes ground level interface connection points 1120. The top of the top most monopole structure section is able to be located at vertical positions that are near the vertical location of the surface 1192 of the ground 1190 into which the enclosed pole embedded portion 1100 is embedded. In some examples, the top of the top most monopole structure is able to have a vertical location that is within several feet or more above or below the surface 1192 of the ground.

In an example, the ground level interface connection points 1120 support attachment of a ground level interface device (not shown) that is described in further detail below.

Figure 12:
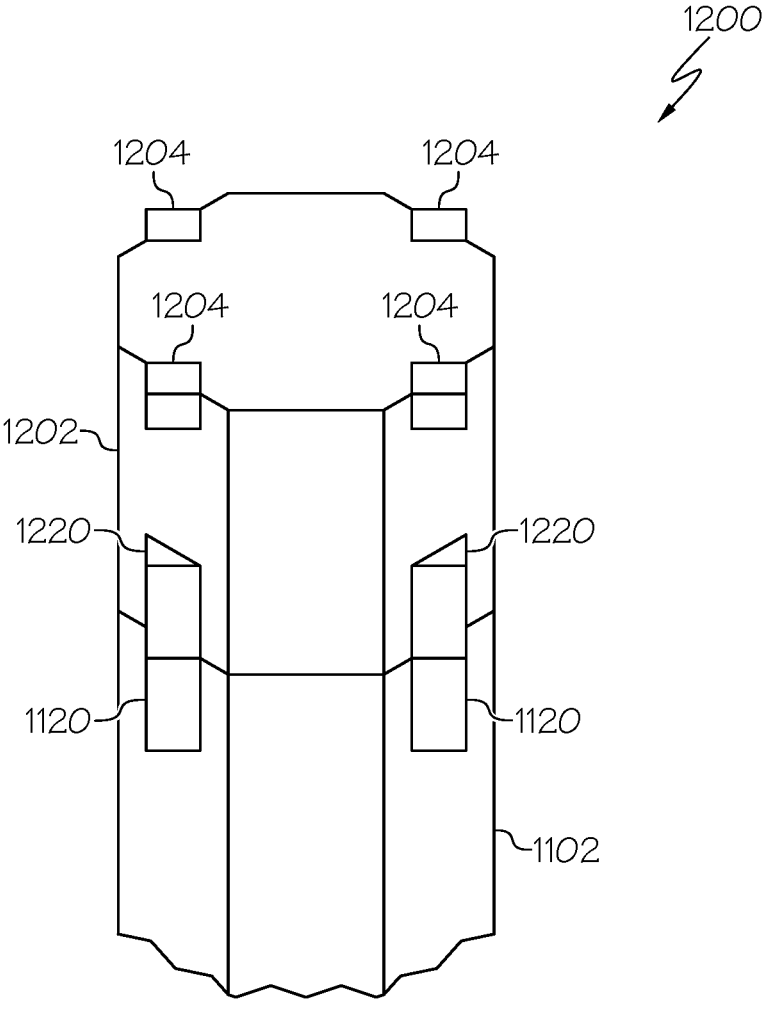
FIG. 12 illustrates a ground level interface, according to an example.

FIG. 12 illustrates a ground level interface 1200, according to an example. The ground level interface 1200 depicts an example of an interface structure that provides a structural connection between an enclosed pole embedded portion 1100 and an above ground tower portion, such as the above described above ground portion 252.

The ground level interface 1200 depicts a ground level interface device 1202 that connects to the ground level interface connection points 1120 located on the top of the top most monopole structure section such as the illustrated first monopole structure section 1102. The ground level interface 1200 further has above ground tower connection points 1204 at its top to support structural attachment of the above ground portion 252. In various examples, the connection of the ground level interface 1200 is able to be structurally attached to the first monopole structure section 1102, the above ground portion 252, or both, by any suitable technique according to the design goals of the tower being constructed.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A tower, comprising:

an above ground portion; and an embedded portion joined to the above ground portion, where the above ground portion and the embedded portion comprise a respective plurality of modular sections, where each respective modular section in each of the respective plurality of modular sections comprises a respective vertical height and a quadrilateral plan view cross section with equal plan view outer dimensions over the respective vertical height of the modular section, where at least one lower modular section of the respective plurality of modular sections in the above ground portion comprises a stronger structure than a modular section of the respective plurality of modular sections in the above ground portion that is above the at least one lower modular section, where each modular section in each of the respective plurality of modular sections comprises corner struts that are parallel to one another, where at least one modular section of the respective plurality of modular sections of the embedded portion is fully embedded into a ground surface, and where the modular sections in each of the respective plurality of modular sections are arranged in a linear sequence.

2. The tower of claim 1, further comprising a line attachment structure depending from a portion of the above ground portion.

3. The tower of claim 1, wherein each modular section further comprises a space lattice structure, and wherein at least a portion of the modular sections in the embedded portion further comprises at least one stitch plate enclosing a perimeter around at least a vertical portion of the modular sections comprising the embedded portion.

4. The tower of claim 1, further comprising at least one guy wire attached between a respective point on the above ground portion and an anchor point on a ground surface.

5. The tower of claim 1, wherein each modular section in each of the respective plurality of modular sections in the linear sequence is joined to a respective adjacent modular section of one of the respective plurality of modular sections by a respective joint element comprising a strip attached to a surface of a first end of each modular section and a second end of the respective adjacent modular section.

6. The tower of claim 1, wherein the respective plurality of modular sections of the above ground portion comprises a first modular section and a second modular section that is positioned lower in the linear sequence than the first modular section, wherein the first modular section comprises structural angles located at each corner of the plan view cross section that have a thinner gauge than structural angles located at each corner of the quadrilateral plan view cross section of the second modular section.

7. The tower of claim 1, wherein each modular section further comprises a space lattice structure having the quadrilateral plan view cross section that forms a square.

8. The tower of claim 1, wherein each modular section further comprises a space lattice structure comprising a respective structural angle at each corner of the quadrilateral plan view cross section, wherein each respective structural angle has equal elevation view heights.

9. The tower of claim 1, wherein each modular section in the respective plurality of modular sections comprises a respective plurality of corner struts arranged parallel to one another in a vertical direction over the respective vertical height of the modular section.

10. The tower of claim 9, wherein the quadrilateral plan view cross section does not taper in the vertical direction.

11. The tower of claim 1, wherein the embedded portion comprises a stitch plate over at least a portion of at least one external side of the embedded portion.

12. The tower of claim 11, wherein the stitch plate comprises plates covering at least a portion of each external side of the embedded portion.

13. The tower of claim 11, wherein the stitch plate comprises metal plates attached to at least one modular section of the respective plurality of modular sections in the embedded portion.

14. The tower of claim 1, wherein two or more modular sections of the respective plurality of modular sections of the embedded portion are embedded into the ground surface.

15. The tower of claim 14, wherein each modular section comprising the embedded portion comprises an uncovered space lattice structure that is directly embedded in the ground surface.

16. A tower, comprising:

an above ground portion; and an embedded portion joined to the above ground portion, where the above ground portion and the embedded portion comprise a respective plurality of modular sections, where each modular section in each of the respective plurality of modular sections comprises a respective vertical height and a quadrilateral plan view cross section with equal plan view outer dimensions over the respective vertical height of the modular section, where each modular section comprises a first end and a second end opposite the first end, where either the first end or the second end is configured to connect to either the first end or the second end of any other modular section in its respective plurality of modular sections, where at least one modular section of the respective plurality of modular sections of the embedded portion is fully embedded into a ground surface, and where the modular sections in each of the respective plurality of modular sections are arranged in a linear sequence.

17. A combination of modular sections, the combination comprising:

at least a first modular section, a second modular section, and an embedded modular section, where the embedded modular section is fully embedded into a ground surface, where the first modular section has a total plan view cross section side length and a vertical height that is perpendicular to and longer than the total plan view cross section side length, where the first modular section comprises a space lattice structure having a square plan view cross section with a first set of dimensions, the square plan view cross section comprising a first plurality of corner struts with each corner strut in the first plurality of corner struts comprising a respective structural angle having a first strength and two legs that each have a horizontal leg length, where the second modular section comprises a space lattice structure having substantially the square plan view cross section comprising a second plurality of corner struts with each corner strut in the second plurality of corner struts comprising a respective structural angle having two respective legs that each have the horizontal leg length and a second strength that is different than the first strength, where the embedded modular section comprises a space lattice structure having substantially the square plan view cross section; and where the corner struts in the first plurality of corner struts and in the second plurality of corner struts are parallel to one another over the vertical height of the first modular section and the second modular section, respectively, and define respective plan view cross sections with equal plan view outer dimensions over the vertical height of the first modular section and the second modular section, respectively.

18. The combination of modular sections of claim 17, wherein each corner strut in the first plurality of corner struts comprises a respective structural angle of a first gauge of metal and each corner strut in the second plurality of corner struts comprises a respective structural angle of a second gauge of metal that is thinner than the first gauge.

19. The combination of modular sections of claim 17, further comprising, for each corner strut in the first plurality of corner struts, a respective joint element joining a respective first interface of each respective corner strut in the first plurality of corner struts to a corresponding respective second interface of each respective corner strut in the second plurality of corner struts.

* * * * *